US012755091B2

(12) United States Patent
Mongha et al.

(10) Patent No.: US 12,755,091 B2
(45) Date of Patent: Oct. 6, 2026

(54) CONTEXTUAL EMBEDDED ANALYTICS SYSTEM

(71) Applicant: SAP SE, Walldorf (DE)

(72) Inventors: Nikhil Raj Nath Mongha, Pleasanton, CA (US); Arasan Rajendren, San Diego, CA (US); Ashish Pathak, San Ramon, CA (US); Sriram Narasimhan, Pleasanton, CA (US); Chien-Tzu Chang, Seattle, WA (US); Amanda Marie Kang, Newcasle, WA (US); Prithvi Krishna Thodla Chandrasekhar, Pleasanton, CA (US); Austin Hwang, Los Altos Hills, CA (US); Pravallika Kavikondala, Redmond, WA (US); Aditi Godbole, Bothell, WA (US)

(73) Assignee: SAP SE, Walldorf (DE)

( * ) Notice: Subject to any disclaimer, the term of this patent is extended or adjusted under 35 U.S.C. 154(b) by 282 days.

(21) Appl. No.: 18/741,258

(22) Filed: Jun. 12, 2024

(65) Prior Publication Data

US 2024/0419893 A1 Dec. 19, 2024

Related U.S. Application Data

(60) Provisional application No. 63/521,822, filed on Jun. 19, 2023.

(51) Int. Cl.

| | |
|---|---|
| ***G06F 40/186*** | (2020.01) |
| ***G06F 16/2457*** | (2019.01) |
| *G06F 3/0484* | (2022.01) |

(52) U.S. Cl.

CPC ...... *G06F 40/186* (2020.01); *G06F 16/24578* (2019.01); *G06F 3/0484* (2013.01)

(58) Field of Classification Search

None

See application file for complete search history.

(56) References Cited

U.S. PATENT DOCUMENTS

| | | | | |
|---|---|---|---|---|
| 11,442,945 | B1 * | 9/2022 | Tsai | G06F 16/2379 |
| 2021/0064431 | A1 * | 3/2021 | Smith | G06F 9/5077 |
| 2021/0133119 | A1 * | 5/2021 | Bono | G06F 12/1009 |
| 2023/0123092 | A1 * | 4/2023 | Shao | H04Q 9/02 340/870.09 |
| 2023/0132033 | A1 * | 4/2023 | Gupta | G06F 11/366 717/120 |
| 2023/0359598 | A1 * | 11/2023 | Binjola | G06F 16/152 |
| 2024/0256555 | A1 * | 8/2024 | Zheng | G06Q 30/0633 |
| 2024/0273306 | A1 * | 8/2024 | Somaiya | G06F 40/186 |

* cited by examiner

*Primary Examiner* — Toan H Vu

(74) *Attorney, Agent, or Firm* — SCHWEGMAN LUNDBERG & WOESSNER, P.A.

(57) ABSTRACT

Systems and methods are provided for detecting input via a user interface on a computing device, determining that the input triggers a recommended action related to the input and analyzing historical data to extract relevant data for the recommended action. The systems and methods further provide for generating the recommended action based on the extracted relevant data and causing display of the recommended action on the user interface of the computing device.

20 Claims, 11 Drawing Sheets

CONTEXTUAL EMBEDDED ANALYTICS SYSTEM

CROSS-REFERENCE TO RELATED APPLICATIONS

This application claims the benefit of U.S. Provisional Application No. 63/521,822, filed Jun. 19, 2023, entitled "CONTEXTUAL EMBEDDED ANALYTICS SYSTEM," which is incorporated herein by reference in its entirety.

BACKGROUND

Entities set various company goals to achieve a higher performance as a company in terms of quality, compliance, savings business specific key performance indicators (KRI), and so forth. These goals, however, can be hard to achieve when each entity has vast data stored across many data sources and geographic areas as well as across different applications making is difficult to get contextual analytics at the point of use in different applications and enable end users to make the data driven choices.

BRIEF DESCRIPTION OF THE DRAWINGS

Various ones of the appended drawings merely illustrate example embodiments of the present disclosure and should not be considered as limiting its scope.

DETAILED DESCRIPTION

Systems and methods described herein relate to a contextual embedded analytics system. As mentioned above, it is difficult to achieve higher quality of service, compliance with various regulations and company requirements, savings, and business process specific KPIs when an entity has vast data stored across many data sources and geographic areas as well as across different applications. It is not possible to manually go hunting for data in different systems or across applications because not only is it unknown what data is available and from what data source or application, it is just not possible to review and process such an extensive amount of data. Accordingly, goals of higher quality or savings or business process specific KPIs are missed, and an entity can fail to comply with various regulations and company requirements.

To address these technical issues, a contextual embedded analytics system provides embedded insightful insights and recommended actions that are triggered based on input by users into the system and an entity's historical data. For example, a user may start inputting a sourcing event to request a bid from suppliers for a certain product or service. This input can trigger the contextual embedded analytics system to analyze prior sourcing events by the entity associated with the user and related data to determine that enabling email bidding will increase the chance of receiving enough bids to meet minimum bid requirements. Analytics related to email and other types of bidding, suppliers relevant to the sourcing event, as well as the requirements of a minimum bid can be presented to the user to review and enable for the sourcing event. The embedded analytics system could also determine that the entity has already sourced the same product or service previously and provide contacts with suppliers previously used, provide previous bids, and other data related to the previous sourcing event. Further, the embedded analytics system can narrow down suppliers from thousands of suppliers based on previous relationships, analytics per supplier, existing agreements with suppliers, and the like. It also provides the framework for entities to create their own contextual embedded insights specific to their goals for their respective applications.

In one example embodiment, the embedded analytics system detects input via a user interface on a computing device and determines that the input triggers an insight for an action related to the input. The embedded analytics system further executes a query to extract relevant data for the insight for the action, generates analytics and at least one recommended action based on the extracted relevant data, and causes display of the analytics and the at least one recommended action on the user interface of the computing device.

Figure 1:
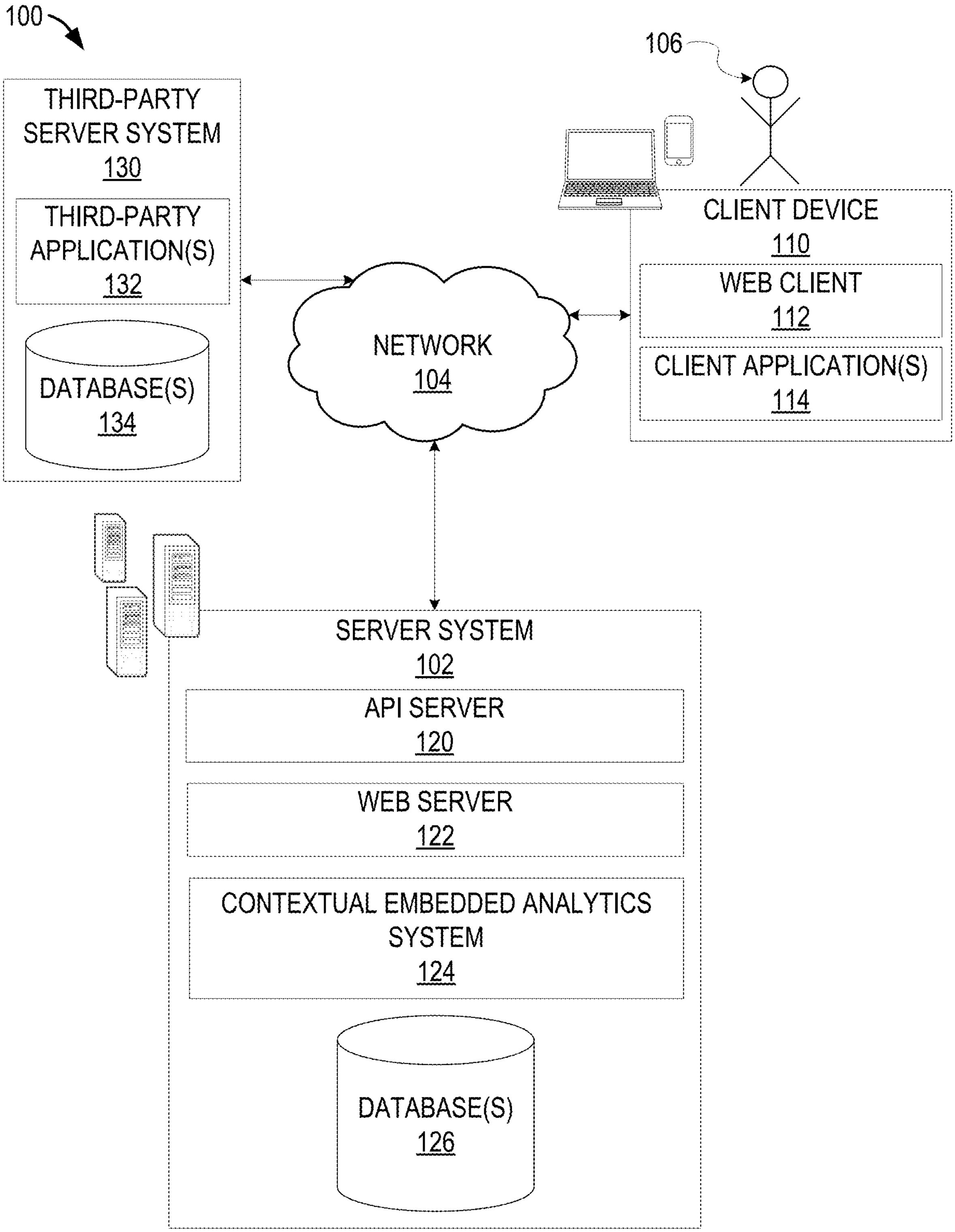
FIG. 1 is a block diagram illustrating a networked system, according to some example embodiments.

FIG. 1 is a block diagram illustrating a networked system 100, according to some example embodiments. The system 100 includes one or more client devices such as client device 110. The client device 110 can comprise, but is not limited to, a mobile phone, desktop computer, laptop, portable digital assistant (PDA), smart phone, tablet, ultrabook, netbook, laptop, multi-processor system, microprocessor-based or programmable consumer electronic, game console, set-top box, computer in a vehicle, wearable computing device, or any other computing or communication device that a user utilizes to access the networked system 100. In some embodiments, the client device 110 comprises a display module (not shown) to display information (e.g., in the form of user interfaces). In further embodiments, the client device 110 comprises one or more of touch screens, accelerometers, gyroscopes, cameras, microphones, global positioning system (GPS) devices, and so forth. The client device 110 is a device of a user 106 that is used to access and utilize cloud services, utilize a contextual embedded analytics system 124, among other applications.

One or more users 106 is a person, a machine, or other means of interacting with the client device 110. In example embodiments, the user 106 may not be part of the system 100 but can interact with the system 100 via the client device 110 or other means. For instance, the user 106 provides input (e.g., touch screen input or alphanumeric input) to the client device 110 and the input can be communicated to other entities in the system 100 (e.g., third-party server system 130, server system 102) via a network 104. In this instance, the other entities in the system 100, in response to receiving the input from the user 106, communicates information to the client device 110 via the network 104 to be presented to the user 106. In this way, the user 106 interacts with the various entities in the system 100 using the client device 110.

The system 100 further include a network 104. One or more portions of network 104 can be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the public switched telephone network (PSTN), a cellular telephone network, a wireless network, a WiFi network, a WiMax network, another type of network, or a combination of two or more such networks.

The client device 110 accesses the various data and applications provided by other entities in the system 100 via web client 112 (e.g., a browser, such as the Internet Explorer® browser developed by Microsoft® Corporation of Redmond, Washington State) or one or more client applications 114. The client device 110 includes one or more client applications 114 (also referred to as "apps") such as, but not limited to, a web browser, a search engine, a messaging application, an electronic mail (email) application, an e-commerce site application, a mapping or location application, a guided sourcing application, a contracts application, a procurement application, an enterprise resource planning (ERP) application, a customer relationship management (CRM) application, an application for accessing and utilizing a contextual embedded analytics system 124, and the like. In one example, the web client 112 utilizes an optimized processing system 116 and/or one or more client application(s) 114 utilize the optimized processing system 116.

In some embodiments, one or more client applications 114 can be included in a given client device 110, and configured to locally provide the user interface and at least some of the functionalities, with the client application(s) 114 configured to communicate with other entities in the system 100 (e.g., third-party server system 130, server system 102, etc.), on an as-needed basis, for data and/or processing capabilities not locally available (e.g., access location information, access machine learning models, to authenticate a user 106, to verify a method of payment, access a contextual embedded analytics system 124, and so forth), and so forth. Conversely, one or more client applications 114 may not be included in the client device 110, and then the client device 110 can use its web browser to access the one or more applications hosted on other entities in the system 100 (e.g., third-party server system 130, server system 102).

A server system 102 provides server-side functionality via the network 104 (e.g., the Internet or wide area network (WAN)) to one or more third-party server system 130 and/or one or more client devices 110. The server system 102 can include an application program interface (API) server 120, a web server 122, and contextual embedded analytics system 124 that can be communicatively coupled with one or more databases 126.

The one or more databases 126 are storage devices that store data related to users of the system 100, applications associated with the system 100, cloud services, machine learning models, data related to entities/products/services, and so forth. The one or more databases 126 can further store information related to third-party server system 130, third-party applications 132, third-party database(s) 134, client devices 110, client applications 114, users 106, and so forth. In one example, the one or more databases 126 is cloud-based storage.

The server system 102 may be a cloud computing environment, according to some example embodiments. The server system 102, and any servers associated with the server system 102, may be associated with a cloud-based application, in some examples.

The contextual embedded analytics system 124 can provide back-end support for third-party applications 132 and client applications 114, including the optimized processing system 116, which may include cloud-based applications. The contextual embedded analytics system 124 comprises one or more servers or other computing devices or systems.

The system 100 further includes one or more third-party server system 130. The one or more third-party server system 130 can include one or more third-party application (s). The one or more third-party application(s) 132, executing on third-party server(s) 130, can interact with the server system 102 via API server 120 via a programmatic interface provided by the API server 120. For example, one or more of the third-party applications 132 can request and utilize information from the server system 102 via the API server 120 to support one or more features or functions on a website hosted by the third party or an application hosted by the third party.

The third-party website or application 132, for example, can provide access to functionality and data supported by third-party server system 130. In one example embodiment, the third-party website or application 132 provides access to functionality that is supported by relevant functionality and data in the third-party server system 130. In another example, a third-party server system 130 is a system associated with an entity that accesses cloud services via server system 102.

The third-party database(s) 134 are storage devices that store data related to users of the third-party server system 130, applications associated with the third-party server system 130, cloud services, machine learning models, parameters, and so forth. The one or more databases 126 can further store information related to third-party applications 132, client devices 110, client applications 114, users 106, and so forth. In one example, the one or more databases 134 are cloud-based storage.

Figure 2:
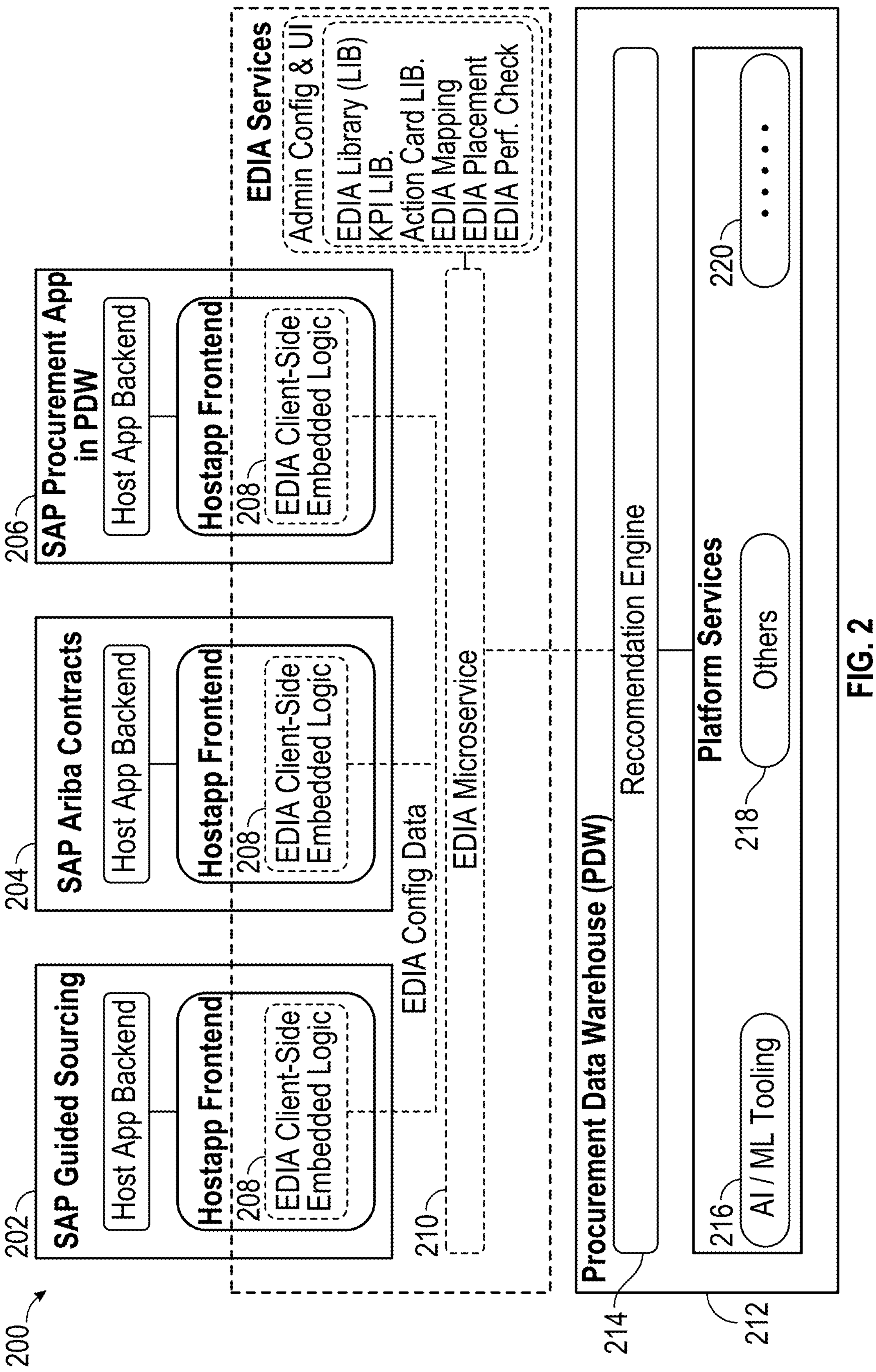
FIG. 2 is a high-level architectural diagram, according to some example embodiments.

FIG. 2 is a high-level architecture diagram 200, according to some example embodiments. The diagram 200 illustrates examples of various consumer applications (e.g., client applications 114) including SAP Guided Sourcing 202, SAP Ariba Contracts 204 and SAP Procurement App 206 that can be used to access the contextual embedded analytics system 124. It is to be understood that more, less, or different applications can be used in example embodiments described herein. These applications are used by end users to do numerous tasks such as sourcing products or services, preparing and executing contracts, procuring products and services, and so forth. Each application can comprise embedded logic, referred to in the diagram 200 as embedded data insights and actions (EDIA) client-side embedded logic 208. The embedded logic allows each application to communicate with an EDIA microservice 210 to configure and access services, provide a user interface, provide a framework to create entity specific EDIA, and other functionality provided by the contextual embedded analytics system 124.

The diagram 200 further comprise a data warehouse 212 (e.g., procurement data warehouse (PDW)) that comprises a recommendation engine 214 and various platform services, such as AI/ML tooling 216, among other services 218 and 220. In some examples, the data warehouse 212 is part of server system 102 and/or contextual embedded analytics system 124. The recommendation engine 214 automatically gathers data in real time (or near real time) to provide for generating analytics and recommendations (including recommended actions).

In one example, a request from an application (e.g., SAP guided sourcing) goes to the EDIA microservice 210 which determines whether there is any insight or recommendation available based on input made in a user interface of the application. The relevant data is gathered from the procurement data warehouse 212 by the recommendation engine 210 and returned to the microservice 210 and embedded logic 208 to generate insights, analytics, recommendations, recommended actions, and so forth. Any generated insights, analytics, recommendations, recommended actions, and so forth, are then provide in a consumable format for display via the requesting application.

In this way, the EDIA microservice 210 of the context embedded analytics system 124, and the embedded logic 208 in a given application, communicates between applications 202, 204 and 206 and the data warehouse 212 and gives contextual filtering so that data is provide in context to an end user in a consumable format, as explained in further detail next.

Figure 3:
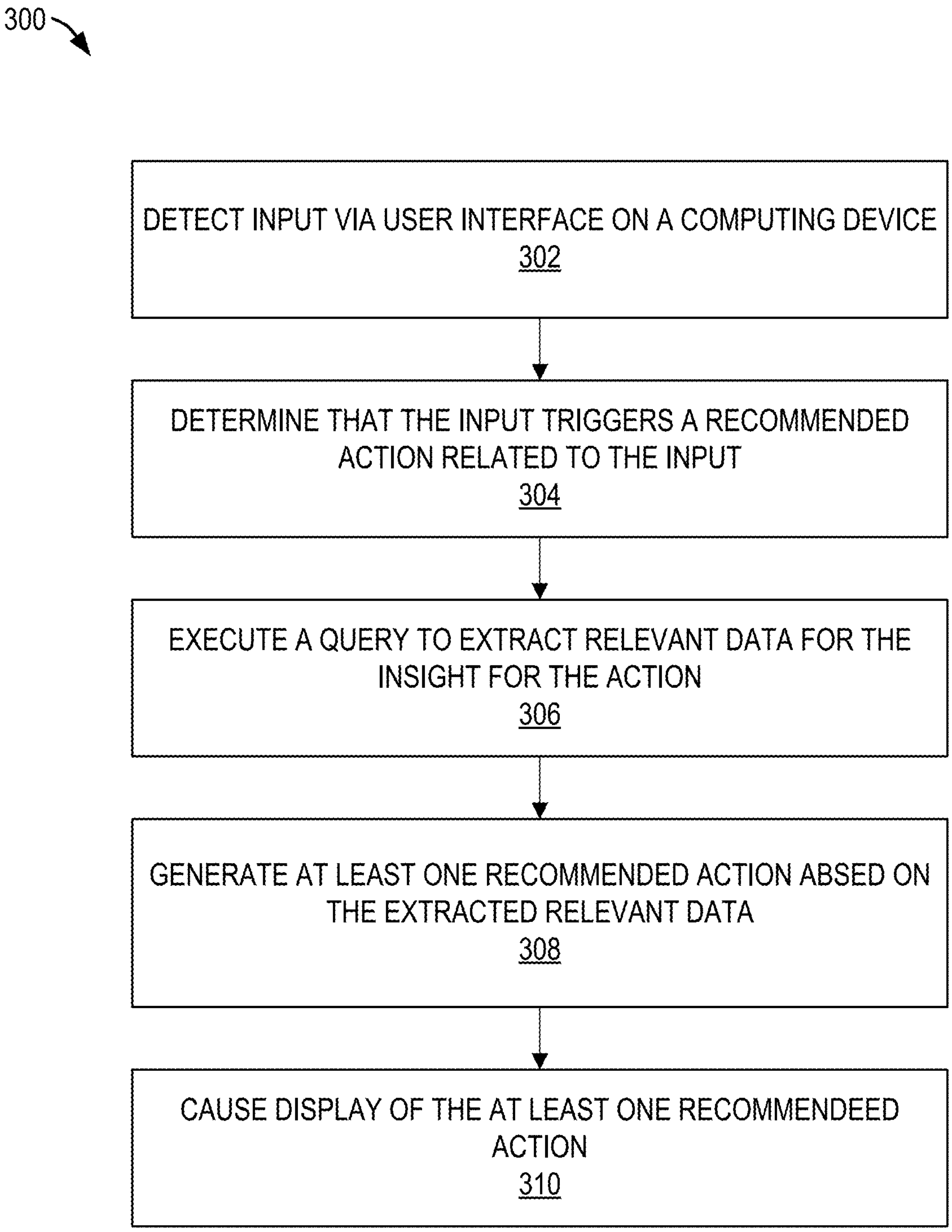
FIG. 3 comprises a flow chart illustrating aspects of a method, according to some example embodiments.

FIG. 3 is a flow chart illustrating aspects of a method 300, according to some example embodiments. For illustrative purposes, method 300 is described with respect to the block diagram of FIG. 1. It is to be understood that method 300 may be practiced with other system configurations in other embodiments.

In operation 302, a computing system (e.g., client device 110, server system 102, contextual embedded analytics system 124) detects input, via a user interface on a computing device. For example, a user using an application 114 on a client device 110, or an application via web client 112, selects, via a user interface of the application, a user interface item (e.g., a menu item, an icon) or inputs data (e.g., character and/or numerical values) into a field of the user interface.

The computing system detects the input and determines whether the input triggers a recommended action related to the input. For example, the computing system determines whether the input meets one or more qualification criteria for a recommended action. Qualification criteria can be predetermined based on insights needed for various use case scenarios, such as sourcing, procurement, contracts, and so forth. In one example, various qualification criteria are mapped to various recommended actions and the computing system can determine if the input meets one or more qualification criteria and which recommended actions are associated with the one or more qualification criteria.

One example of a recommended action is for selection of one or more recommended templates that have been historically used for a scenario related to the input. Another example of a recommended action is for an event duration relevant to the input. Yet another example of a recommended action is for a recommendation to request e-bidding for a supplier. Based on input, such as a source type, geographical location, budget, and so forth, the computing system determines whether the input triggers one or more of these example recommendation actions, or other recommendation actions.

In operation 304, the computing system determines that the input triggers a recommended action related to the input. In one example, the computing system first reviews data in a cache to determine whether there is a match in the cache for recent relevant data for the recommended action. If there is a match, the computing system returns the relevant data for at least one recommended action. Otherwise, the computing system proceed to operation 306.

In operation 306, the computing system analyzes historical data to extract relevant data for the recommended action. In one example, the computing system executes a query (e.g., an SQL query) to extract relevant data for the recommended action. In one example, the query is executed against a data warehouse or other data store comprising data related to an entity. The computing system uses the extracted relevant data to generate at least one recommended action based on the extracted relevant data, in operation 308.

In some examples, the computing system further generates analytics from the extracted relevant data. In some examples, the analytics comprise key performance indicators, charts, graphs, or other information and graphics to provide further information and recommendations related to the input. In some examples, the computing system uses machine learning algorithms to analyze patterns and learn from historical data to generate the analytics and at least one recommended action based on extracted relevant data.

As mentioned above, in some examples, the computing system uses the extracted relevant data to generate recommended templates or a list of entities for the recommended action. Typically, there are hundreds or more templates for a given entity that can be used in various scenarios. The computing system analyzes historical data to extract relevant data for the recommended action by determining a transaction type associated with the input. For instance, a transaction type can be procurement of a particular type of commodity or service, such as packaging supplies, office furniture, appliance maintenance, and so forth. The computing system detects past transactions of the transaction type and determines templates used in the past transactions for the transaction type. The computing system determines an amount of usage for each template, such as how many discrete times (e.g., 23, 55) each template was used in the past transactions or a percentage (e.g., 20%, 45%, 79%) the template was used in the past transactions compared to all the templates used in the past transactions for the transaction type. The computing system generates a list of templates used in past transactions of the transaction type. In one example, the computing system ranks the templates based on the usage for each template.

In some examples, the computing system further determines a geographical location and a budget (e.g., baseline spend) based on the input to detect past transactions of the particular type in the geographical location and/or for a similar budget. In these examples, the computing system generates the list of templates used in past transactions for the transaction type and at least one of the geographical location and budget.

As mentioned above, in some examples, the computing system uses the extracted relevant data to generate a recommended event duration as the recommended action. The computing system analyzes historical data to extract relevant data for the recommended action by determining one or more event durations corresponding to the input. An example of an event duration is the amount of time a sourcing event stays open for suppliers to submit their respective bids for a particular good or service being sourced, such as 25 days or 30 days. The computing system determines a transaction type associated with the input and detects past transactions of the transaction type, as explained above and determines a duration for each of the past transactions for the transaction type. The computing system determines a recommended event duration by selecting a most common duration or averaging the durations for all of the past transactions for the transaction type. Using a specific example where the input corresponds to sourcing office chairs in Chicago, based on years of historical data the computing system can determine that it typically or on average takes 25 days to source chairs for the Chicago area.

As mentioned above, in some examples, the computing system uses the extracted relevant data to generate a recommendation to request e-bidding for a supplier. For example, the computing system analyzes the historical data to determine if at least one supplier relevant to the scenario for the input has accepted e-bids in previous transactions. In some examples, the computing system only considers recommending requesting e-bidding if a supplier has e-bid on over a threshold number (e.g., 50, 200) or percentage (e.g., 30%, 50%) of transactions.

In operation 310, the computing system causes display of the at least one recommended action on the user interface of the computing device. In some examples, an alert icon is displayed and if selected, the analytics and recommended action is displayed. In some examples, the at least one recommended action are shown as action cards. In some examples, the computing system further causes display of analytics with the recommended action. The analytics can comprise key performance indicators, as described above.

In one example, causing display of the at least one recommended action comprises causing display of one or more templates. In one example, the computing systems only causes display of one or more templates having historical usage over a specified threshold usage, such as over a certain number of transactions or over a certain percentage of transactions, as explained above. Templates that do not meet the threshold usage are not displayed. In this way, the computing system defines a quality threshold so that the most useful data is presented. In some examples, if the computing system determines that no templates have a historical average over a specified threshold, then the recommended action is not displayed.

In some examples, the templates are displayed in ranked order. In some examples, historical usage information is displayed for each displayed template. Such as that a given template has been used 30% of the time or 45 times in similar transactions.

In one example, causing display of the at least one recommended action comprises causing display of at least one event duration that meets a specified threshold usage, such as over a certain number of transactions or over a certain percentage of transactions.

In one example, causing display of the at least one recommended action comprises causing display of a request for e-bidding for at least one supplier based on the at least one supplier historically accepting over a threshold number of e-bids.

The computing system can provide recommended actions in real time (or near real time) in response to input from a user. In some examples, a user may change the input (e.g., change the budget or geographic location), the computing system detects the change to the input and, in real time or near real time, generates a updated list of templates used in past transactions of the transaction type based on the change to the input. The computing system ranks the updated list of templates based on historical usage and causes display of the one or more templates from the updated list of templates having historical usage over a specified threshold usage.

In another example, the user may change the input (e.g., change the budget of geographic location), the computing system detects the change to the input and, in real time or near real time, determines one or more updated event durations corresponding to the change to the input. The computing system causes display of at least one updated event duration that mees a specified historical usage threshold, as explained above.

In some examples, metrics are captured about the insight, such as analytics, recommended action, and the like. For example, the computing system detects selection of the at least one recommended action and stores the selection of the at least one recommended action as data associated with the recommended action. For example, the computing system detects section of a recommended template or entity and stores the selection of the recommended template or entity as data associated with the recommended action. The data associated with the recommended action, such as display count (how many times it was displayed to users), click rate (how many times users clicked on the template recommendation), and acceptance rate (how many times users selected the template recommendation), can be used to generate metrics to inform future analytics and recommended actions as well as to confirm compliance with entity goals and regulations such as the European Union regulation General Data Protection Regulation (GDPR).

Figure 4:
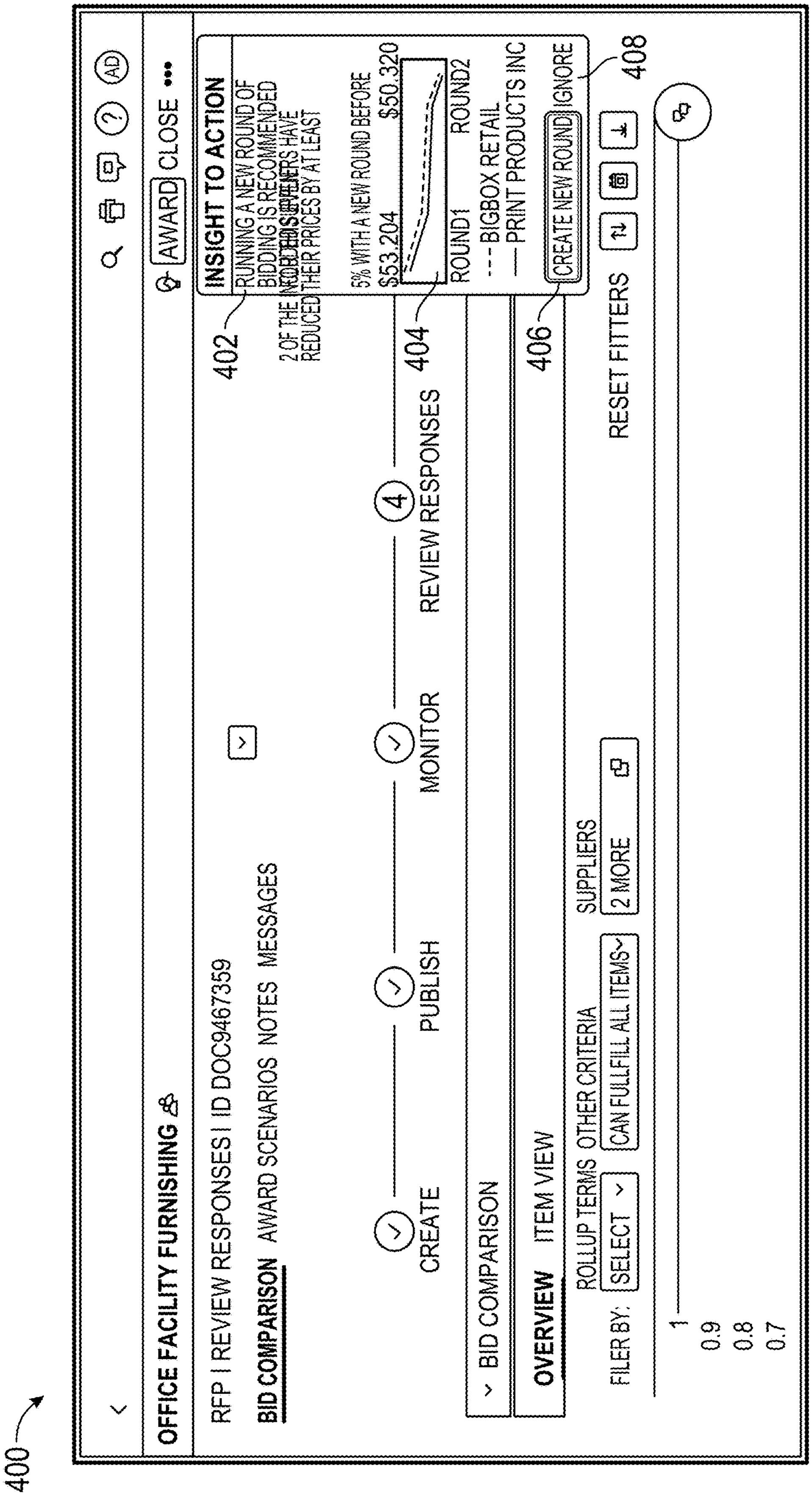
FIGS. 4-6 each illustrate an example user interface, according to some example embodiments.

FIG. 4 illustrates an example user interface 400 of an application for guided sourcing (e.g., SAP guided sourcing 202). Based on user input and activity related to sourcing a new event, such as facility furnishing, in the user interface 400, the computing system provides an "insight to action" 402 (e.g., EDIA), otherwise referred to herein as a recommended action, that is displayed in the user interface 400 that provides a recommendation to run a new round of bidding for the event to get better prices because two of the included suppliers have reduced their prices by at least 5%. The insight to action further shows a graph with further information about the price decrease and suppliers. The insight to action comprises an option 406 to select the action to create a new round of bidding (e.g., selected the recommended action) and an option 408 to ignore the recommendation.

Figure 5:
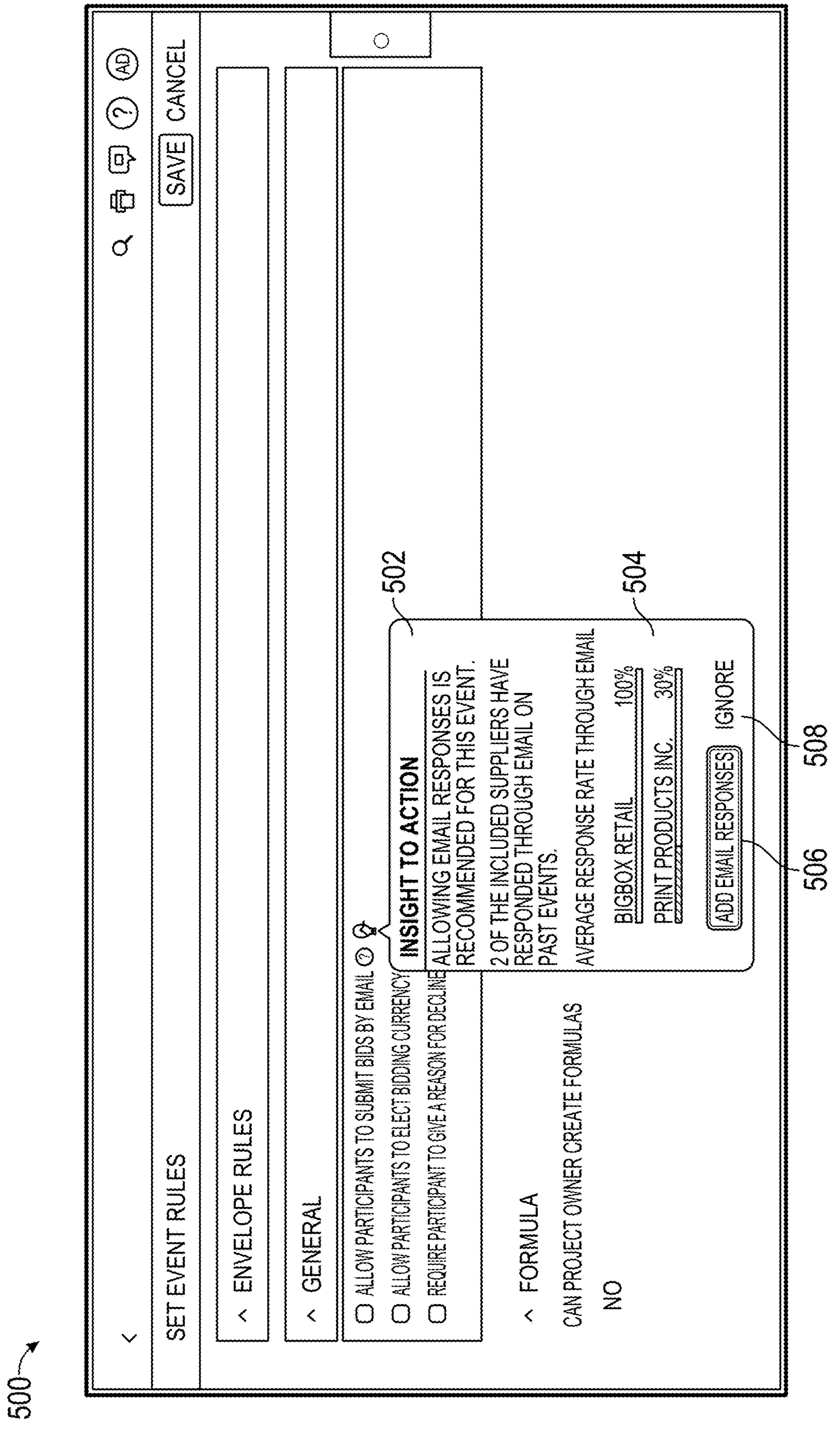

FIG. 5 illustrates an example user interface 500 of an application for setting event rules for a sourcing event. Based on user input and activity in the user interface 500 related to sourcing a new event, the computing system provides an "insight to action" 502 (e.g., EDIA), otherwise referred to herein as a recommended action, that is displayed on the user interface 500 that provides a recommendation to allow email responses (e.g., e-bidding) since two of the included suppliers have responded through email on past events. The insight to action 502 further shows analytics 504 related to the suppliers' response rate through email. The insight to action comprises an option 506 to select the action to add email responses and an option 508 to ignore the recommendation.

Figure 6:
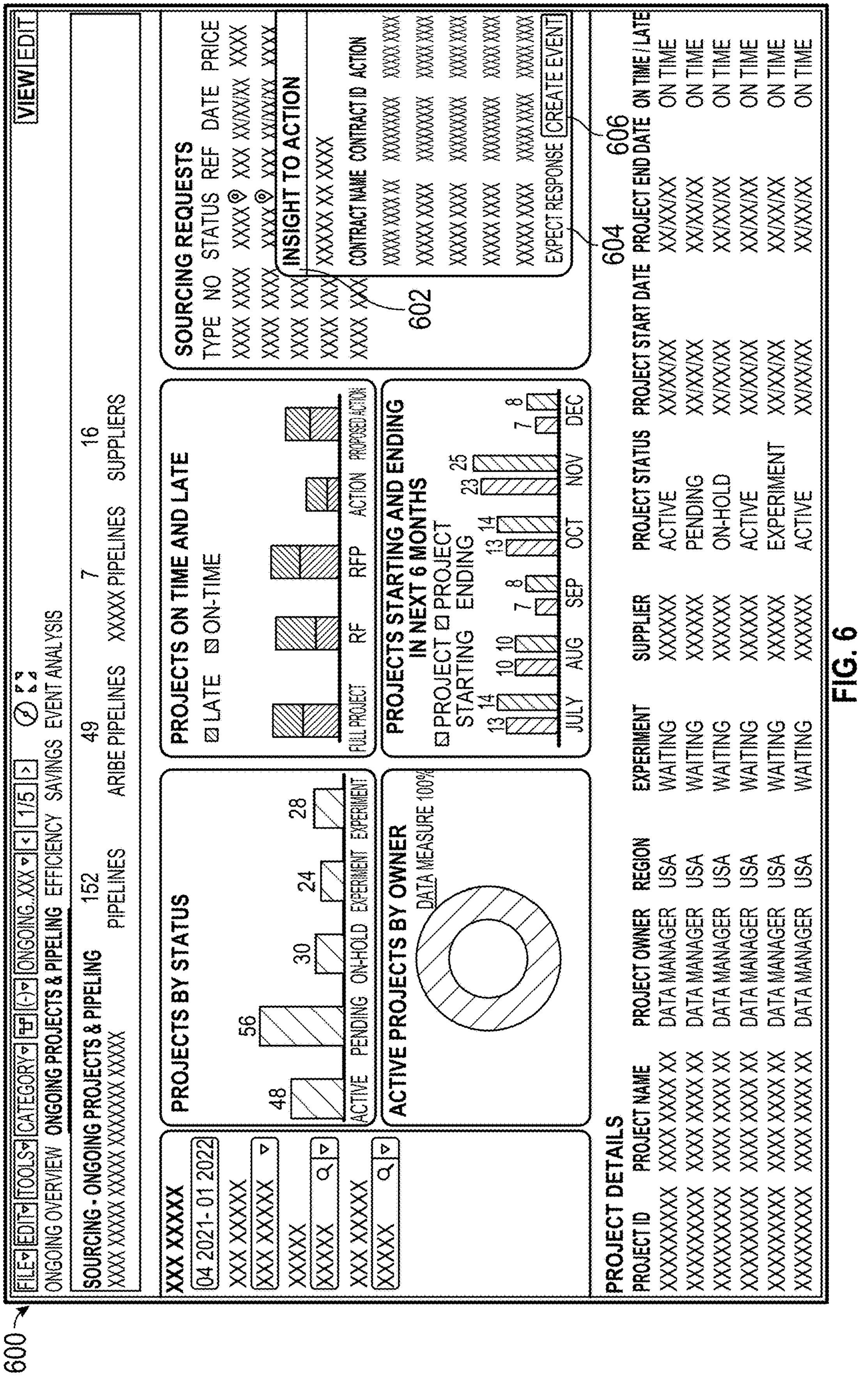

FIG. 6 illustrates an example user interface 600 of an SAP Analytical Cloud application that is displaying information about ongoing projects and pipeline. The computing system provides insights that cuts across different applications (e.g., contracts, sourcing) and based on the historical data, determines that there are existing contracts for this entity. Based on the information displayed, the computing system provides an "insight to action" 602 (e.g., EDIA), otherwise referred to herein as a recommended action, that recommends extending existing contracts to fulfill demand sooner with better pricing. The insight to action 602 comprises an option 604 to select the action to extend one or more existing contracts and an option 606 to ignore the recommendation.

Figure 7:
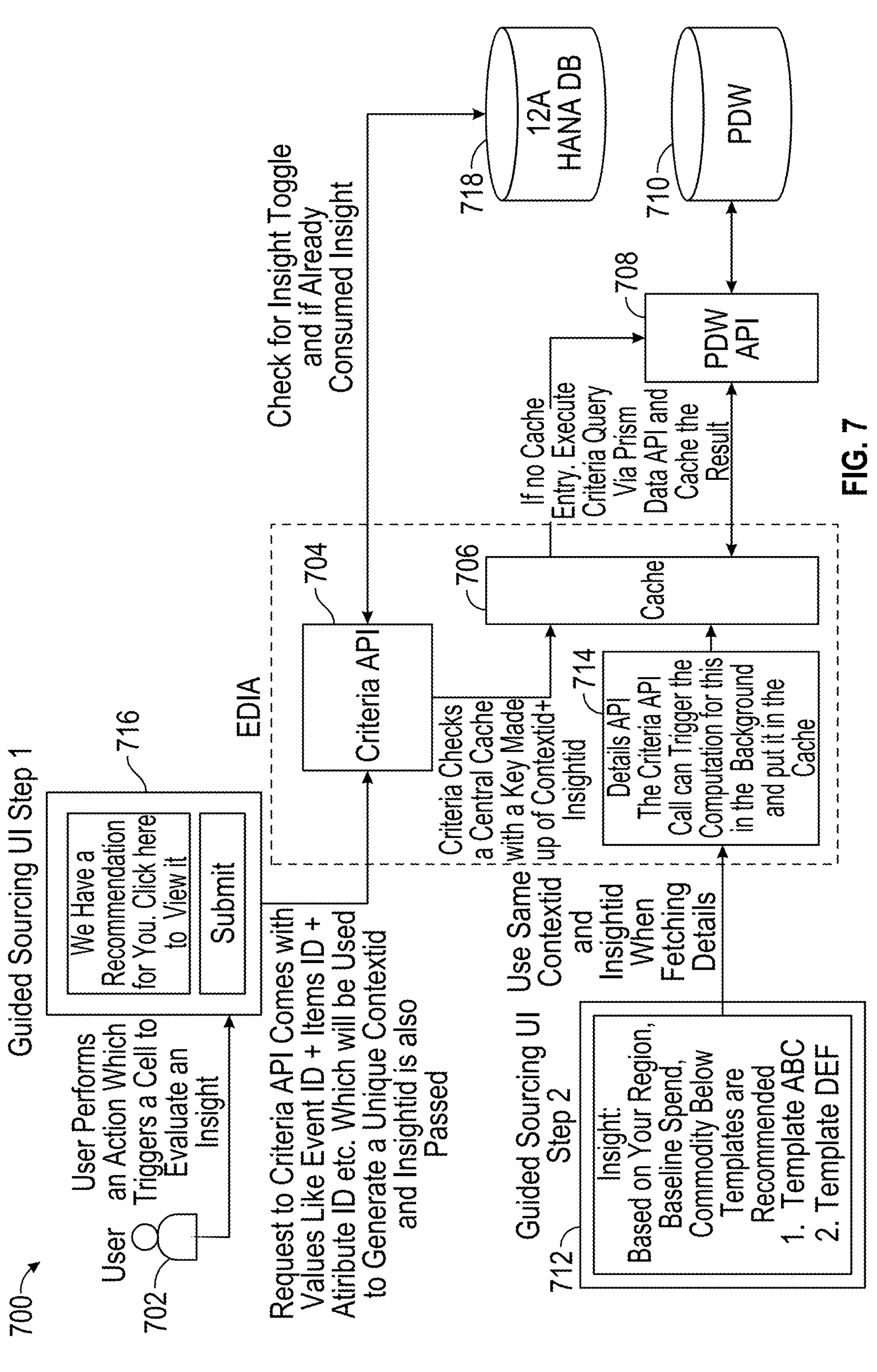
FIG. 7 comprises a flow diagram, according to some example embodiments.

FIG. 7 is a flow diagram 700 illustrating further detail related to the method shown in the flow chart of FIG. 3 and explained above. As explained above, a user 702 performs an action, via a computing device, which triggers a call to evaluate an insight. In one example, a guided sourcing UI is displayed to the user for selection to view a recommendation. The computing system receives a request, via the computing device, via a criteria API 704. The request can include one or more values such as an event identifier, an item identifier, an attribution identifier, and the like, which will be used to generate a unique context identifier and insight identifier. In one example, the computing system checks a central cache 706 with a key made up of the context identifier and the insight identifier. The computing system can check for an insight toggle to determine if a user has already consumed an insight against a database 718. If there is no cache entry, the computing system executes a criteria query via the data warehouse (e.g., procurement data warehouse (PDW)) API 708 to the PDW 710 and caches the result in the cache 706.

The computing system causes display on the computing device of the insight 712 (e.g., with recommended templates ABC and DEF) and uses the same context identifier and insight identifier when fetching details. The details API and criteria API 714 can then trigger computation for this in the background and put it in the cache 706.

Figure 8:
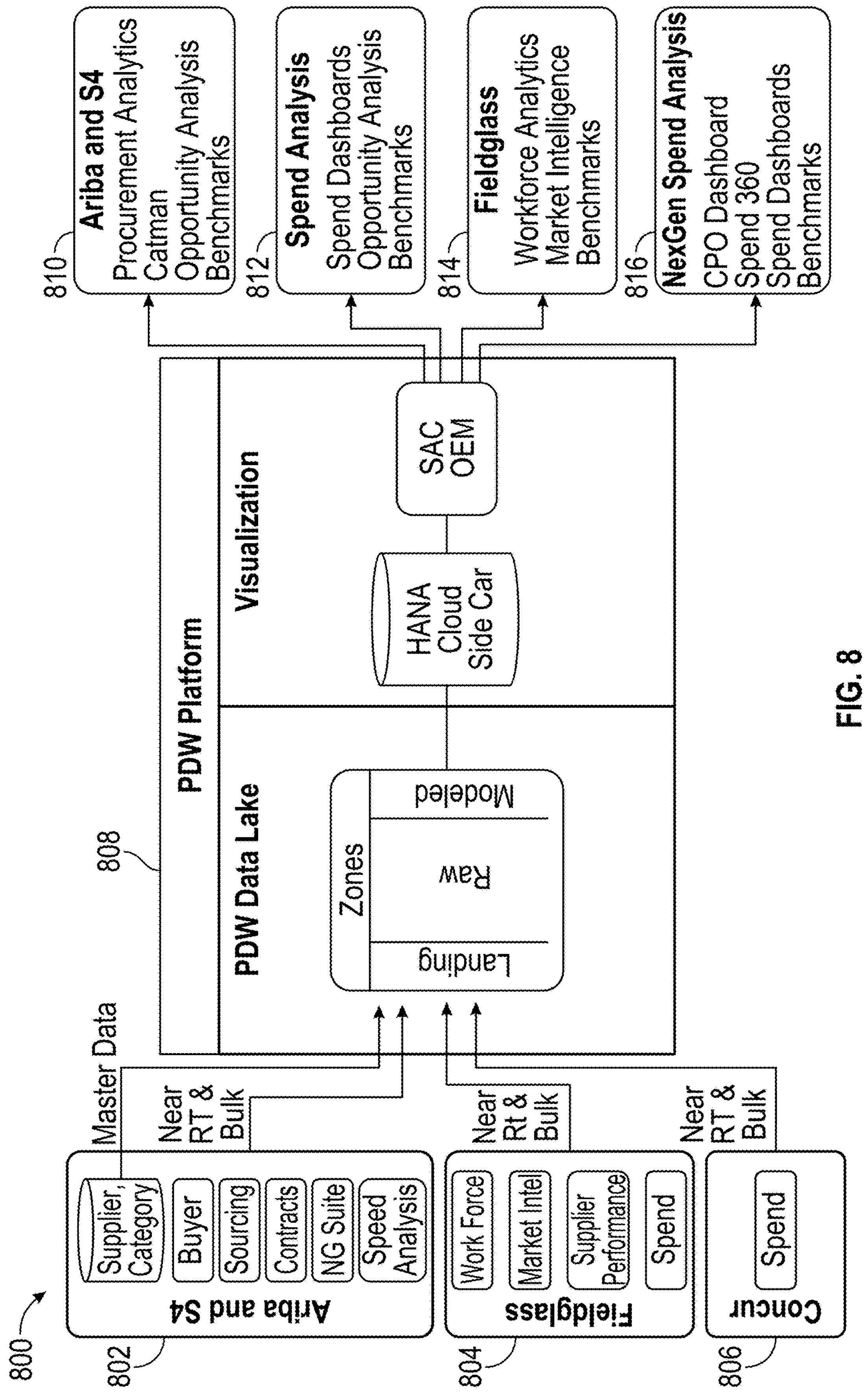
FIG. 8 comprises a flow diagram, according to some example embodiments.

FIG. 8 comprises an example flow diagram that shows the flow from example applications 802, 804, 806 on the left, through the PDW platform 808 that can be hosted in the server system 102 or is part of the contextual embedded analytics system 124, to various example insights 810, 812, 814 and 816 including analytics on the right.

Figure 9:
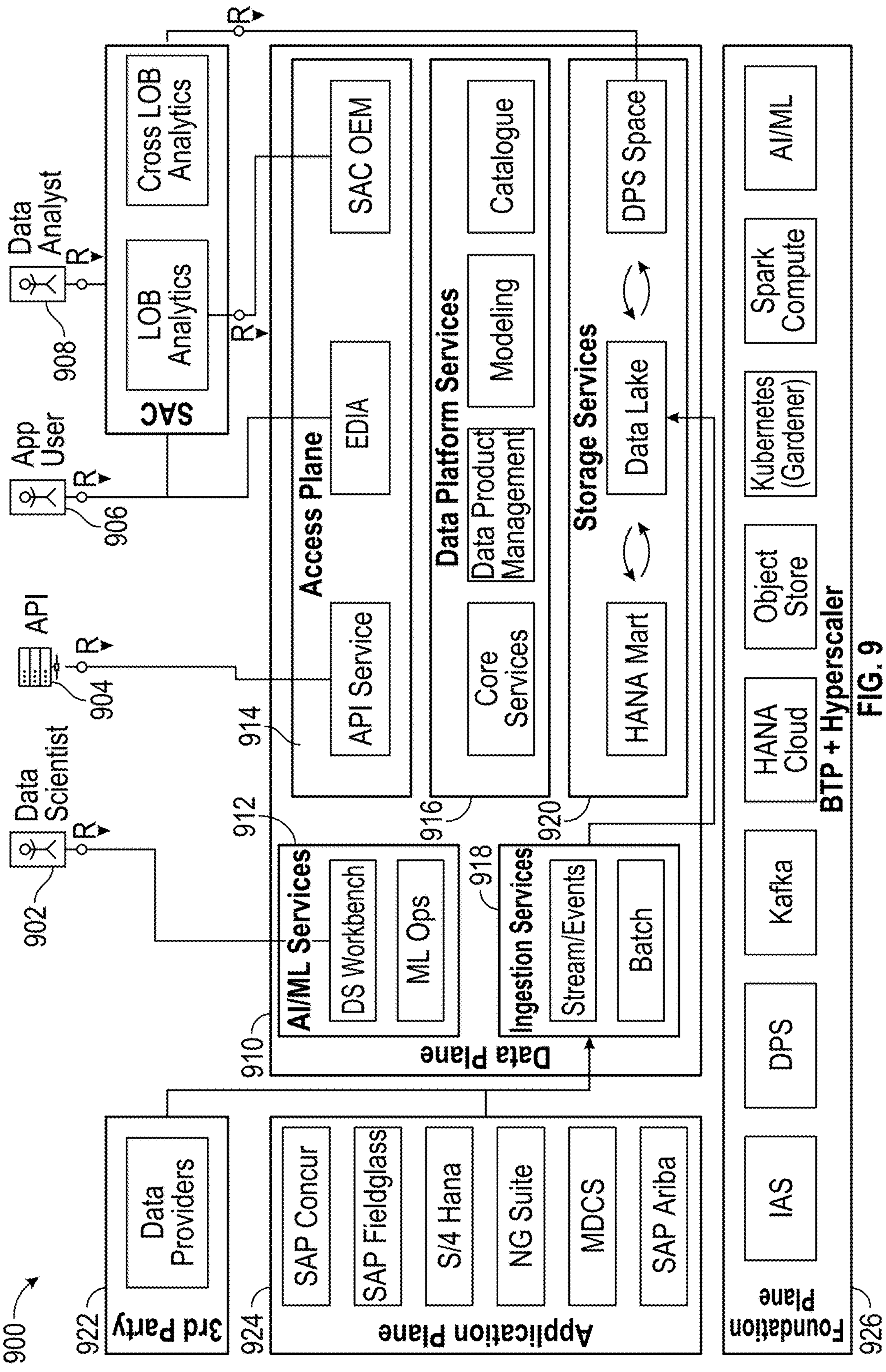
FIG. 9 comprises an architectural diagram, according to some example embodiments.

FIG. 9 comprises an example architectural diagram 900 that shows various types of users and input, such as a data scientist 902, an API 904, an app user 906, a data analyst 908, third party data providers 922, and applications 924, that accesses the contextual embedded analytics system 124 via a data plane 910 that comprises AI/ML services 912, an access plane 914, data platform services 916, integration services 918 and storage services 920. The architectural diagram 900 also comprises a foundation p lace 926. It is to be understood that other or different services can be provided in example embodiments described herein.

In the ways described herein, the contextual embedded analytics system 124 provides embedded analytics at the point of user and contextual guidance at the business process level to achieve desired goals related to quality, compliance, savings and others. Further, no end user training is needed and no data load is needed to provide such analytics and contextual guidance.

Moreover, the contextual analytics system 124 provides an entity specific data driven contextual insight and embedded analytics generating system that justifies clear actions for the end user in their natural flow of an application. Insight and analytics are entity specific and based on that entity's historical data, no data is exposed between entities.

Figure 10:
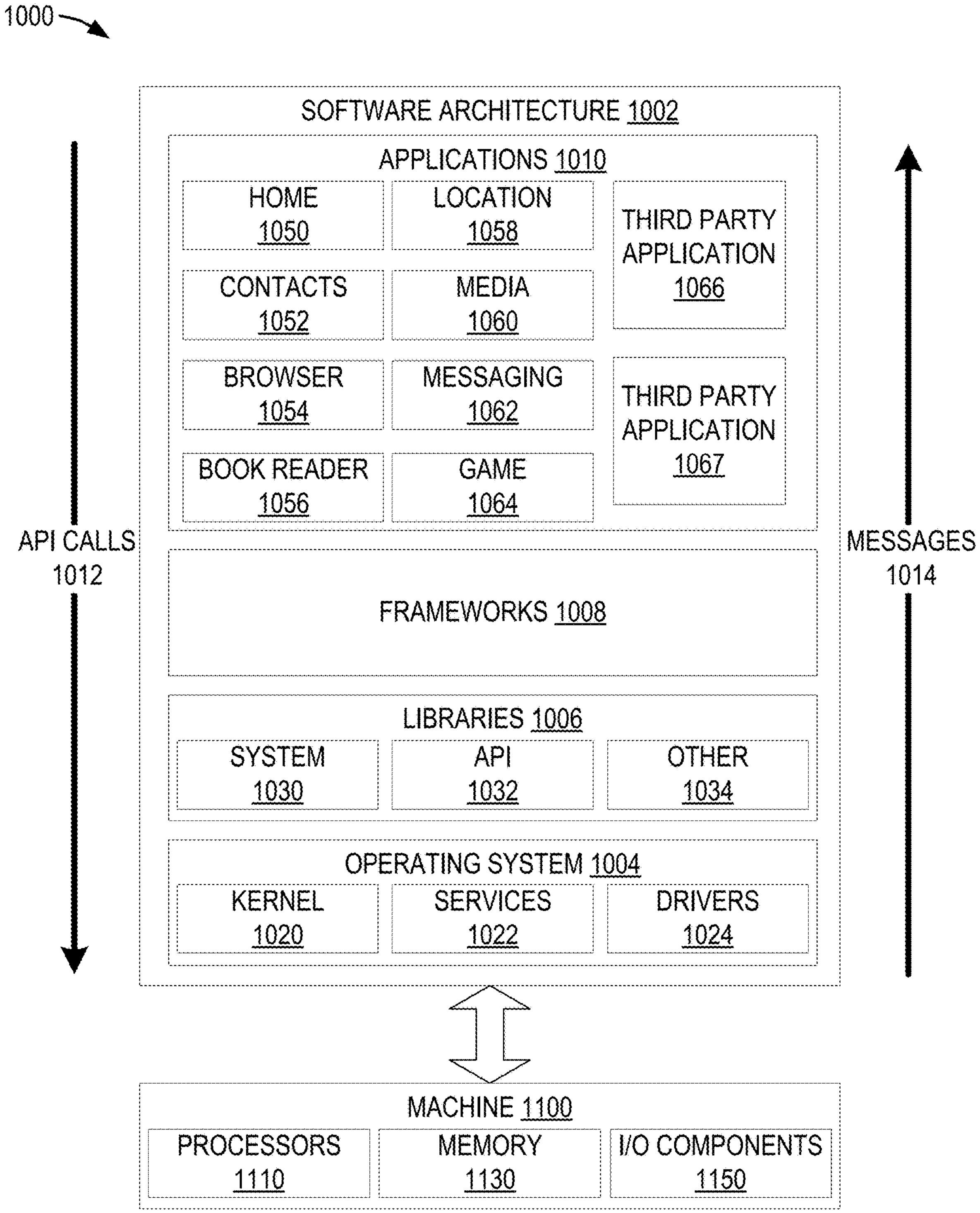
FIG. 10 is a block diagram illustrating an example of a software architecture that may be installed on a machine, according to some example embodiments.

FIG. 10 is a block diagram 1000 illustrating software architecture 1002, which can be installed on any one or more of the devices described above. For example, in various embodiments, client devices 110 and servers and systems 130, 102, 120, 122, and 124 may be implemented using some or all of the elements of software architecture 1002. FIG. 10 is merely a non-limiting example of a software architecture, and it will be appreciated that many other architectures can be implemented to facilitate the functionality described herein. In various embodiments, the software architecture 1002 is implemented by hardware such as machine 1100 of FIG. 11 that includes processors 1110, memory 1130, and input/output (I/O) components 1150. In this example, the software architecture 1002 can be conceptualized as a stack of layers where each layer may provide a particular functionality. For example, the software architecture 1002 includes layers such as an operating system 1004, libraries 1006, frameworks 1008, and applications 1010. Operationally, the applications 1010 invoke application programming interface (API) calls 1012 through the software stack and receive messages 1014 in response to the API calls 1012, consistent with some embodiments.

In various implementations, the operating system 1004 manages hardware resources and provides common services. The operating system 1004 includes, for example, a kernel 1020, services 1022, and drivers 1024. The kernel 1020 acts as an abstraction layer between the hardware and the other software layers, consistent with some embodiments. For example, the kernel 1020 provides memory management, processor management (e.g., scheduling), component management, networking, and security settings, among other functionality. The services 1022 can provide other common services for the other software layers. The drivers 1024 are responsible for controlling or interfacing with the underlying hardware, according to some embodiments. For instance, the drivers 1024 can include display drivers, camera drivers, BLUETOOTH® or BLUETOOTH® Low Energy drivers, flash memory drivers, serial communication drivers (e.g., Universal Serial Bus (USB) drivers), WI-FI® drivers, audio drivers, power management drivers, and so forth.

In some embodiments, the libraries 1006 provide a low-level common infrastructure utilized by the applications 1010. The libraries 1006 can include system libraries 1030 (e.g., C standard library) that can provide functions such as memory allocation functions, string manipulation functions, mathematic functions, and the like. In addition, the libraries 1006 can include API libraries 1032 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and in three dimensions (3D) graphic content on a display), database libraries (e.g., SQLite to provide various relational database functions), web libraries (e.g., WebKit to provide web browsing functionality), and the like. The libraries 1006 can also include a wide variety of other libraries 1034 to provide many other APIs to the applications 1010.

The frameworks 1008 provide a high-level common infrastructure that can be utilized by the applications 1010, according to some embodiments. For example, the frameworks 1008 provide various graphical user interface (GUI) functions, high-level resource management, high-level location services, and so forth. The frameworks 1008 can provide a broad spectrum of other APIs that can be utilized by the applications 1010, some of which may be specific to a particular operating system 1004 or platform.

In an example embodiment, the applications 1010 include a home application 1050, a contacts application 1052, a browser application 1054, a book reader application 1056, a location application 1058, a media application 1060, a messaging application 1062, a game application 1064, and a broad assortment of other applications such as third-party applications 1066 and 1067. According to some embodiments, the applications 1010 are programs that execute functions defined in the programs. Various programming languages can be employed to create one or more of the applications 1010, structured in a variety of manners, such as object-oriented programming languages (e.g., Objective-C, Java, or C++) or procedural programming languages (e.g., C or assembly language). In a specific example, the third-party application 1066 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 1066 can invoke the API calls 1012 provided by the operating system 1004 to facilitate functionality described herein.

Figure 11:
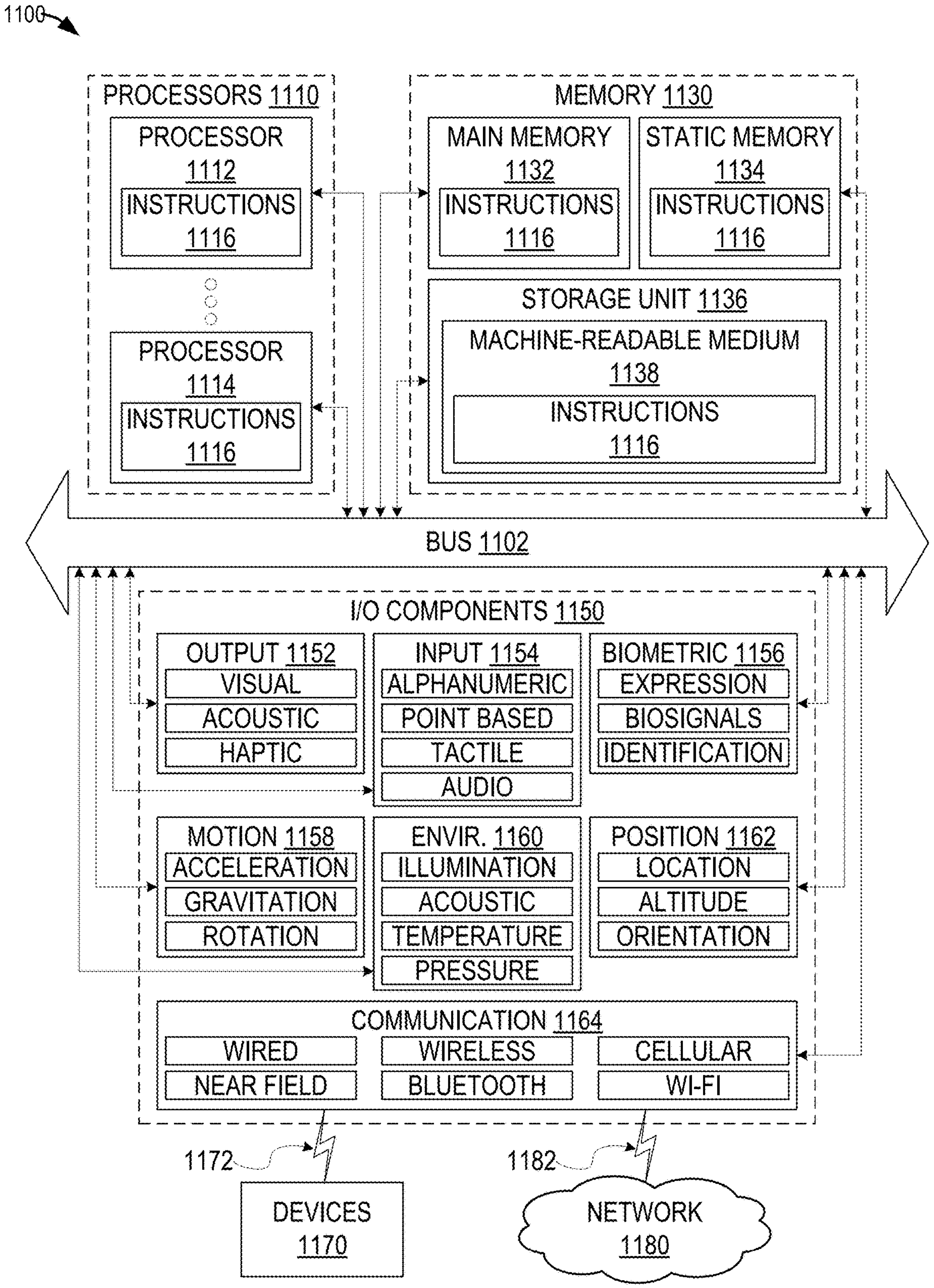
FIG. 11 illustrates a diagrammatic representation of a machine, in the form of a computer system, within which a set of instructions may be executed for causing the machine to perform any one or more of the methodologies discussed herein, according to an example embodiment.

FIG. 11 is a block diagram illustrating components of a machine 1100, according to some embodiments, able to read instructions from a machine-readable medium (e.g., a machine-readable storage medium) and perform any one or more of the methodologies discussed herein. Specifically, FIG. 11 shows a diagrammatic representation of the machine 1100 in the example form of a computer system, within which instructions 1116 (e.g., software, a program, an application 1010, an applet, an app, or other executable code) for causing the machine 1100 to perform any one or more of the methodologies discussed herein can be executed. In alternative embodiments, the machine 1100 operates as a standalone device or can be coupled (e.g., networked) to other machines. In a networked deployment, the machine 1100 may operate in the capacity of a server machine or system 130, 102, 120, 122, 124, etc., or a client device 110 in a server-client network environment, or as a peer machine in a peer-to-peer (or distributed) network environment. The machine 1100 can comprise, but not be limited to, a server computer, a client computer, a personal computer (PC), a tablet computer, a laptop computer, a netbook, a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1116, sequentially or otherwise, that specify actions to be taken by the machine 1100. Further, while only a single machine 1100 is illustrated, the term "machine" shall also be taken to include a collection of machines 1100 that individually or jointly execute the instructions 1116 to perform any one or more of the methodologies discussed herein.

In various embodiments, the machine 1100 comprises processors 1110, memory 1130, and I/O components 1150, which can be configured to communicate with each other via a bus 1102. In an example embodiment, the processors 1110 (e.g., a central processing unit (CPU), a reduced instruction set computing (RISC) processor, a complex instruction set computing (CISC) processor, a graphics processing unit (GPU), a digital signal processor (DSP), an application specific integrated circuit (ASIC), a radio-frequency integrated circuit (RFIC), another processor, or any suitable combination thereof) include, for example, a processor 1112 and a processor 1114 that may execute the instructions 1116. The term "processor" is intended to include multi-core processors 1110 that may comprise two or more independent processors 1112, 1114 (also referred to as "cores") that can execute instructions 1116 contemporaneously. Although FIG. 11 shows multiple processors 1110, the machine 1100 may include a single processor 1110 with a single core, a single processor 1110 with multiple cores (e.g., a multi-core processor 1110), multiple processors 1112, 1114 with a single core, multiple processors 1112, 1114 with multiples cores, or any combination thereof.

The memory 1130 comprises a main memory 1132, a static memory 1134, and a storage unit 1136 accessible to the processors 1110 via the bus 1102, according to some embodiments. The storage unit 1136 can include a machine-readable medium 1138 on which are stored the instructions 1116 embodying any one or more of the methodologies or functions described herein. The instructions 1116 can also reside, completely or at least partially, within the main memory 1132, within the static memory 1134, within at least one of the processors 1110 (e.g., within the processor's cache memory), or any suitable combination thereof, during execution thereof by the machine 1100. Accordingly, in various embodiments, the main memory 1132, the static memory 1134, and the processors 1110 are considered machine-readable media 1138.

As used herein, the term "memory" refers to a machine-readable medium 1138 able to store data temporarily or permanently and may be taken to include, but not be limited to, random-access memory (RAM), read-only memory (ROM), buffer memory, flash memory, and cache memory. While the machine-readable medium 1138 is shown, in an example embodiment, to be a single medium, the term "machine-readable medium" should be taken to include a single medium or multiple media (e.g., a centralized or distributed database, or associated caches and servers) able to store the instructions 1116. The term "machine-readable medium" shall also be taken to include any medium, or combination of multiple media, that is capable of storing instructions (e.g., instructions 1116) for execution by a machine (e.g., machine 1100), such that the instructions 1116, when executed by one or more processors of the machine 1100 (e.g., processors 1110), cause the machine 1100 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory (e.g., flash memory), an optical medium, a magnetic medium, other non-volatile memory (e.g., erasable programmable read-only memory (EPROM)), or any suitable combination thereof. The term "machine-readable medium" specifically excludes non-statutory signals per se.

The I/O components 1150 include a wide variety of components to receive input, provide output, produce output, transmit information, exchange information, capture measurements, and so on. In general, it will be appreciated that the I/O components 1150 can include many other components that are not shown in FIG. 11. The I/O components 1150 are grouped according to functionality merely for simplifying the following discussion, and the grouping is in no way limiting. In various example embodiments, the I/O components 1150 include output components 1152 and input components 1154. The output components 1152 include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor), other signal generators, and so forth. The input components 1154 include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

In some further example embodiments, the I/O components 1150 include biometric components 1156, motion components 1158, environmental components 1160, or position components 1162, among a wide array of other components. For example, the biometric components 1156 include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1158 include acceleration sensor components (e.g., accelerometer), gravitation sensor components, rotation sensor components (e.g., gyroscope), and so forth. The environmental components 1160 include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensor components (e.g., machine olfaction detection sensors, gas detection sensors to detect concentrations of hazardous gases for safety or to measure pollutants in the atmosphere), or other components that may provide indications, measurements, or signals corresponding to a surrounding physical environment. The position components 1162 include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication can be implemented using a wide variety of technologies. The I/O components 1150 may include communication components 1164 operable to couple the machine 1100 to a network 1180 or devices 1170 via a coupling 1182 and a coupling 1172, respectively. For example, the communication components 1164 include a network interface component or another suitable device to interface with the network 1180. In further examples, communication components 1164 include wired communication components, wireless communication components, cellular communication components, near field communication (NFC) components, BLUETOOTH® components (e.g., BLUETOOTH® Low Energy), WI-FI® components, and other communication components to provide communication via other modalities. The devices 1170 may be another machine 1100 or any of a wide variety of peripheral devices (e.g., a peripheral device coupled via a Universal Serial Bus (USB)).

Moreover, in some embodiments, the communication components 1164 detect identifiers or include components operable to detect identifiers. For example, the communication components 1164 include radio frequency identification (RFID) tag reader components, NFC smart tag detection components, optical reader components (e.g., an optical sensor to detect one-dimensional bar codes such as a Universal Product Code (UPC) bar code, multi-dimensional bar codes such as a Quick Response (QR) code, Aztec Code, Data Matrix, Dataglyph, MaxiCode, PDF417, Ultra Code, Uniform Commercial Code Reduced Space Symbology (UCC RSS)-2D bar codes, and other optical codes), acoustic detection components (e.g., microphones to identify tagged audio signals), or any suitable combination thereof. In addition, a variety of information can be derived via the communication components 1164, such as location via Internet Protocol (IP) geo-location, location via WI-FI® signal triangulation, location via detecting a BLUETOOTH® or NFC beacon signal that may indicate a particular location, and so forth.

In various example embodiments, one or more portions of the network 1180 can be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the public switched telephone network (PSTN), a plain old telephone service (POTS) network, a cellular telephone network, a wireless network, a WI-FI® network, another type of network, or a combination of two or more such networks. For example, the network 1180 or a portion of the network 1180 may include a wireless or cellular network, and the coupling 1182 may be a Code Division Multiple Access (CDMA) connection, a Global System for Mobile communications (GSM) connection, or another type of cellular or wireless coupling. In this example, the coupling 1182 can implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

In example embodiments, the instructions 1116 are transmitted or received over the network 1180 using a transmission medium via a network interface device (e.g., a network interface component included in the communication components 1164) and utilizing any one of a number of well-known transfer protocols (e.g., Hypertext Transfer Protocol (HTTP)). Similarly, in other example embodiments, the instructions 1116 are transmitted or received using a transmission medium via the coupling 1172 (e.g., a peer-to-peer coupling) to the devices 1170. The term "transmission medium" shall be taken to include any intangible medium that is capable of storing, encoding, or carrying the instructions 1116 for execution by the machine 1100, and includes digital or analog communications signals or other intangible media to facilitate communication of such software.

Furthermore, the machine-readable medium 1138 is non-transitory (in other words, not having any transitory signals) in that it does not embody a propagating signal. However, labeling the machine-readable medium 1138 "non-transitory" should not be construed to mean that the medium is incapable of movement; the machine-readable medium 1138 should be considered as being transportable from one physical location to another. Additionally, since the machine-readable medium 1138 is tangible, the machine-readable medium 1138 may be considered to be a machine-readable device.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A computer-implemented method comprising:

detecting input via a user interface on a computing device;

determining that the input triggers a recommended action related to the input;

analyzing historical data to extract relevant data for the recommended action by performing operations comprising:

executing a query against a data warehouse comprising data related to an entity;

determining a transaction type associated with the input;

generating a list of templates used in past transactions of the transaction type; and ranking the list of templates based on historical usage; and causing display, on the user interface of the computing device, of the recommended action comprising one or more templates having historical usage over a specified threshold usage.

2. The computer-implemented method of claim 1, further comprising:

detecting selection of the recommended action; and storing the selection of the recommended action as a metric associated with the recommended action.

3. The computer-implemented method of claim 1, wherein before analyzing historical data to extract relevant data for the recommended action, the method comprises:

reviewing data in a cache to determine that there is no match in the cache for recent relevant data for the recommended action.

4. The computer-implemented method of claim 1, wherein the input is a selection of a user interface item or data entered into a field value of the user interface.

5. The computer-implemented method of claim 1, wherein determining that the input triggers a recommended action related to the input comprises determining that the input meets a qualification criteria for the recommended action.

6. The computer-implemented method of claim 1, wherein the one or more templates are displayed in ranked order based on historical usage.

7. The computer-implemented method of claim 1, further causing display of historical usage information for each displayed template of the one or more templates.

8. The computer-implemented method of claim 1, further comprising:

detecting selection of a template of the one or more templates; and storing the selection of the template as a metric associated with the recommended action.

9. The computer-implemented method of claim 1, further comprising:

detecting a change to the input;

generating an updated list of templates used in past transactions of the transaction type based on the change to the input;

ranking the updated list of templates based on historical usage; and causing display of one or more templates from the updated list of templates having historical usage over a specified threshold usage.

10. The computer-implemented method of claim 1, further comprising:

not displaying the recommended action based on determining that no templates have a historical usage over a specified threshold usage.

11. The computer-implemented method of claim 1, further comprising:

determining one or more event durations corresponding to the input; and causing display of a second recommended action comprising at least one event duration that meets a specified historical threshold usage.

12. The computer-implemented method of claim 11, further comprising:

detecting a change to the input;

determining one or more updated event durations corresponding to the change to the input; and causing display of at least one updated event duration that meets a specified historical threshold usage.

13. The computer-implemented method of claim 1, further comprising:

causing display of a second recommended action to request e-bidding for at least one supplier based on the at least one supplier historically accepting over a threshold number of e-bids.

14. The computer-implemented method of claim 1, further comprising:

causing display of analytics with the recommended action, the analytics comprising key performance indicators.

15. A computing system comprising:

a memory that stores instructions; and one or more processors configured by the instructions to perform operations comprising:

detecting input via a user interface on a computing device;

determining that the input triggers a recommended action related to the input;

analyzing historical data to extract relevant data for the recommended action by performing operations comprising:

executing a query against a data warehouse comprising data related to an entity;

determining a transaction type associated with the input;

generating a list of templates used in past transactions of the transaction type; and ranking the list of templates based on historical usage; and causing display, on the user interface of the computing device, of the recommended action comprising one or more templates having historical usage over a specified threshold usage.

16. The computing system of claim 15, wherein the one or more templates are displayed in ranked order based on historical usage.

17. The computing system of claim 15, further causing display of historical usage information for each displayed template of the one or more templates.

18. The computing system of claim 15, the operations further comprising:

detecting selection of a template of the one or more templates; and storing the selection of the template as a metric associated with the recommended action.

19. The computing system of claim 15, the operations further comprising:

detecting a change to the input;

generating an updated list of templates used in past transactions of the transaction type based on the change to the input;

ranking the updated list of templates based on historical usage; and causing display of one or more templates from the updated list of templates having historical usage over a specified threshold usage.

20. A non-transitory computer-readable medium comprising instructions stored thereon that are executable by at least one processor to cause a computing device to perform operations comprising:

detecting input via a user interface on a computing device;

determining that the input triggers a recommended action related to the input;

analyzing historical data to extract relevant data for the recommended action by performing operations comprising:

executing a query against a data warehouse comprising data related to an entity;

determining a transaction type associated with the input;

generating a list of templates used in past transactions of the transaction type; and ranking the list of templates based on historical usage; and causing display, on the user interface of the computing device, of the recommended action comprising one or more templates having historical usage over a specified threshold usage.

* * * * *